(No Model.) 2 Sheets—Sheet 1.

G. A. METCALF.
SEAT FOR STREET CARS.

No. 392,876. Patented Nov. 13, 1888.

Witnesses.
Thomas Hobday.
E. G. Alexander.

Inventor.
George A. Metcalf,
by A. N. Spencer, Attorney.

(No Model.) 2 Sheets—Sheet 2.

G. A. METCALF.
SEAT FOR STREET CARS.

No. 392,876. Patented Nov. 13, 1888.

WITNESSES: Chas. F. Crafts, William E. Fallon.

INVENTOR: George A. Metcalf by A. H. Reeves, atty.

UNITED STATES PATENT OFFICE.

GEORGE A. METCALF, OF MALDEN, MASSACHUSETTS.

SEAT FOR STREET-CARS.

SPECIFICATION forming part of Letters Patent No. 392,876, dated November 13, 1888.

Application filed May 5, 1887. Serial No. 237,174. (No model.)

*To all whom it may concern:*

Be it known that I, GEORGE A. METCALF, of Malden, in the county of Middlesex and State of Massachusetts, have invented certain new and useful Improvements in Seats for Street-Cars, of which the following, taken in connection with the accompanying drawings, is a specification.

The object of this invention is to provide supplementary seats for street-cars and other public vehicles, having the usual longitudinal seats running along the sides of the car in the direction of its length. Such vehicles are liable to be crowded with passengers, and my purpose is to furnish additional seats for use when the ordinary ones are occupied. By placing the supplementary seats in a higher plane than the others and somewhat in front of the arm or space between them the occupants of the new seats do not disturb those in the old ones, and by arranging such new seats to turn up edgewise when unoccupied they do not prevent free access to the others.

My invention is hereinafter fully described, and is particularly referred to in the appended claim.

Figure 1:
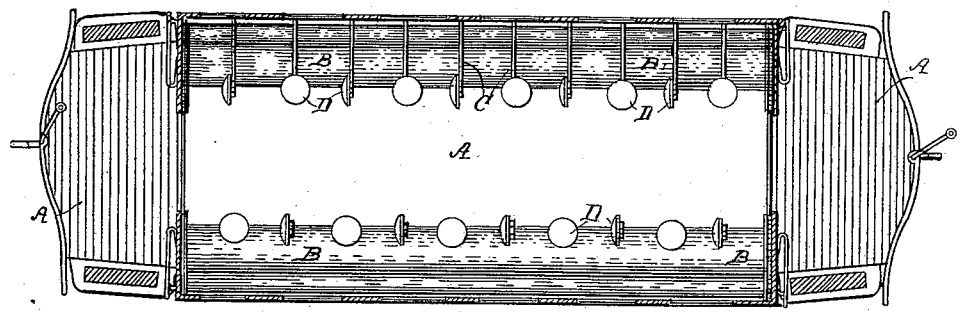
Figure 2:
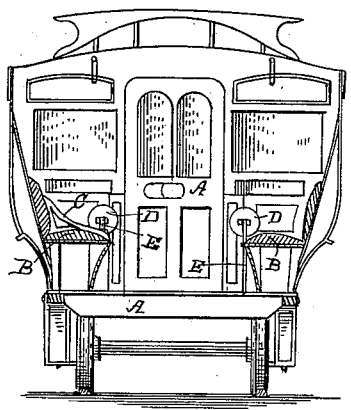
Figure 3:
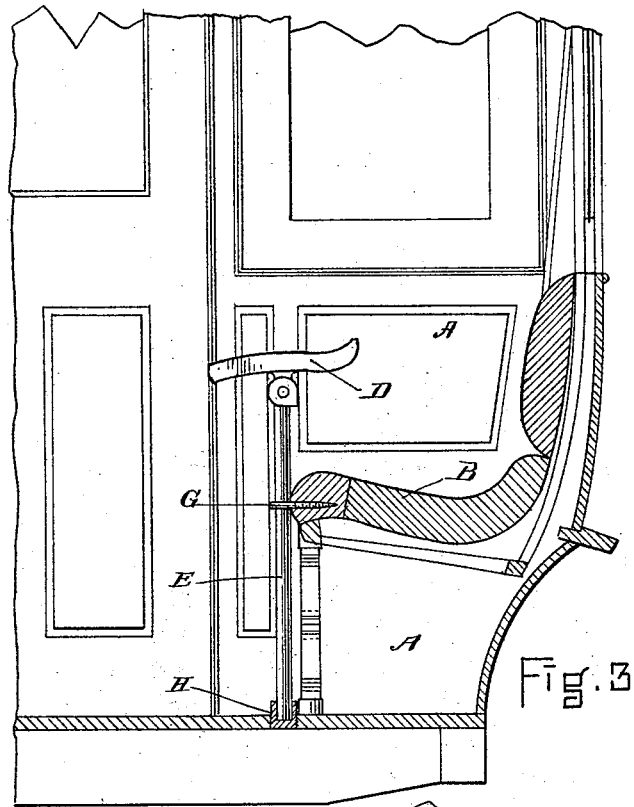
Figure 4:
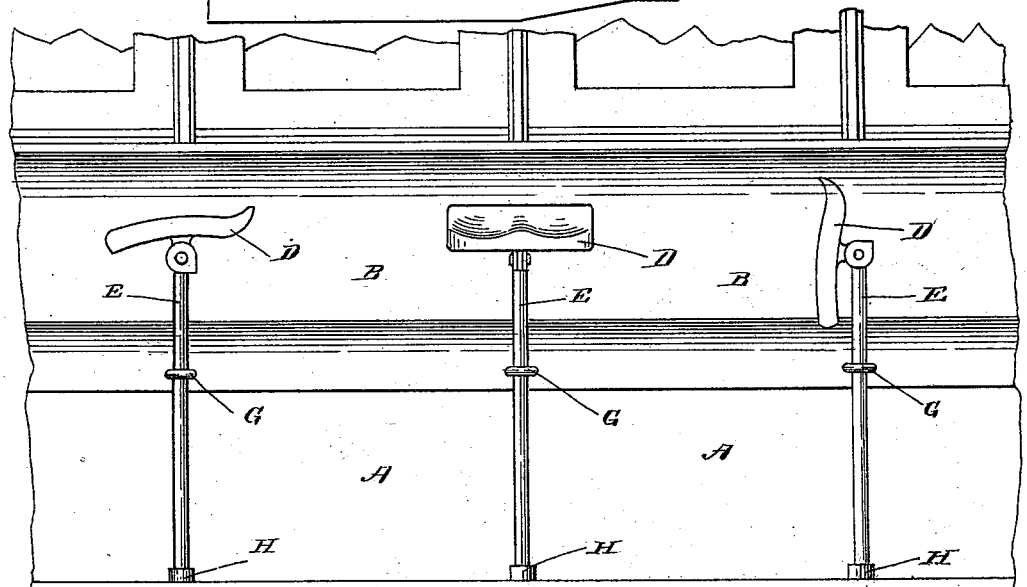

In the drawings, Figure 1 is a plan of a street-car embodying my improvements, with the top removed to show the arrangement of seats. Fig. 2 is a vertical section of the same, and Figs. 3 and 4 are details hereinafter explained.

The car A is provided with the usual seats, B, running along its sides, as in ordinary street-cars. Such long seats may be divided into separate sittings by transverse arms C, or may be left undivided, as desired. In front of the arms or spaces between the several sittings on seat B, I provide a series of supplementary seats, D, located in a higher plane than said sittings, so that other passengers may be seated in front of those occupying the main seat without incommoding them. The supplementary seats may be arranged along one or both sides of the car and placed opposite to or alternating with each other.

The supports for the supplementary seats may be fixed or removable, and such seats may remain horizontal or turn up edgewise when not in use. With my improvement the seat has a bracket or ring, G, fixed to the front of seat B, through which the standard or leg E of the seat D passes downwardly to a socket, H, in the floor, which may be angular to prevent rotation of the leg. The seat is shown hinged to the top of the standard E, to turn up when not in use. Such seats and standards may remain permanently in position in the car, or may be removed together or separately from their place, to be readily restored when required.

I am aware of the common practice of providing swinging and other seats in front of store-counters for the accommodation of customers while shopping; but this provision is foreign to my invention and has no relation to the longitudinal seats of a street-car.

Temporary raised seats have heretofore been proposed having standards hinged at the foot to fold back against the wall or to drop down against the front of the main seat when not in use. These I disclaim; but

I claim as my invention—

A vehicle provided with longitudinal seats B, having eyes or staples G in their front edges, in combination with the supplemental seats D, having straight standards E, adapted to pass through said staples, and with floor-sockets H to engage the lower ends of said standards, substantially as and for the purpose set forth.

In testimony whereof I have signed my name to this specification, in the presence of two subscribing witnesses, on this 11th day of April, A. D. 1887.

GEORGE A. METCALF.

Witnesses:
A. H. SPENCER,
ELIHU G. LOOMIS.